Sept. 2, 1958  D. V. HALL  2,850,293
DEMOUNTABLE TRAILER HITCH
Filed March 5, 1957  2 Sheets-Sheet 1

Donald V. Hall
INVENTOR.

BY *Clarence A. O'Brien*
*and Harvey B. Jacobson*
Attorneys

Sept. 2, 1958     D. V. HALL     2,850,293
DEMOUNTABLE TRAILER HITCH
Filed March 5, 1957     2 Sheets-Sheet 2
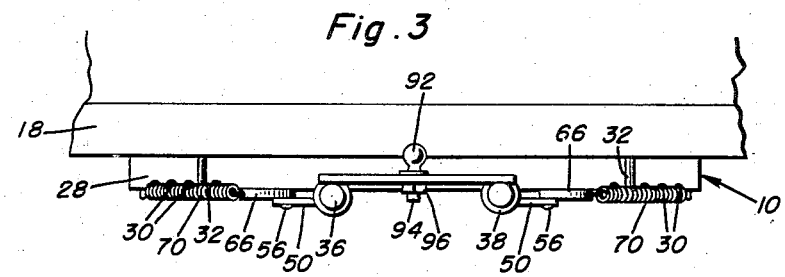
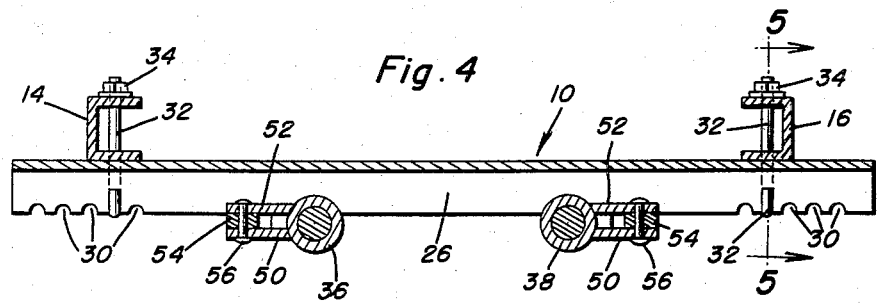
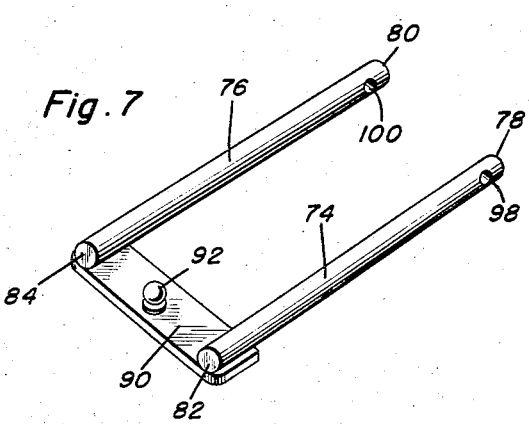
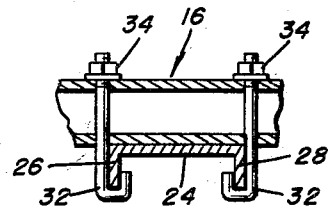
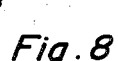
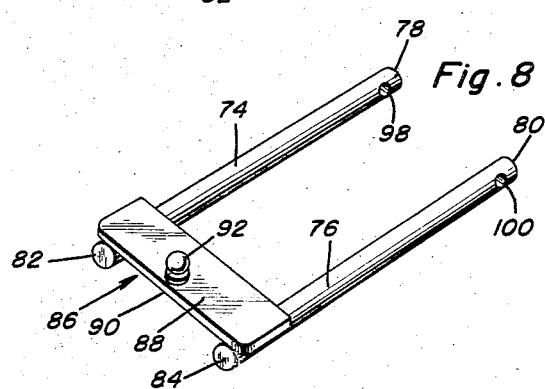
Donald V. Hall
INVENTOR.
BY

United States Patent Office 2,850,293
Patented Sept. 2, 1958

2,850,293

DEMOUNTABLE TRAILER HITCH

Donald V. Hall, Amarillo, Tex.

Application March 5, 1957, Serial No. 644,057

1 Claim. (Cl. 280—491)

This invention relates in general to trailer hitches and more particularly to an improved two piece trailer hitch, one piece of which may be attached to a towing vehicle and the second piece being insertable therein.

A constant problem confronting the owner of a trailer is the fact that the trailer ball which is utilized to tow a trailer projects outward and backward from a towing vehicle, when the trailer is not attached, thus presenting an unsightly appearance in addition to which needless damage may be caused by another car colliding with the ball.

A further problem confronting users of a trailer hitch is the fact that various trailer tongues may be of different height, or with various loads in the rear of the towing vehicle the height of such vehicle may vary by several inches.

Therefore, the primary object of this invention is to provide a trailer hitch which may be easily installed and removed from a towing vehicle and when the hitch is removed there will be no projections beyond the bumper of the towing vehicle.

A further object of this invention is to provide a trailer hitch which may be easily adjusted in height.

A still further object of this invention is to provide a two-piece trailer hitch, one piece of which is attached to the frame of the towing vehicle, and the second piece being removable therefrom, with positive locking means provided for maintaining the removable piece in position when in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a rear elevation of the trailer hitch, shown installed on a vehicle with portions of the rear bumper of the vehicle broken away;

Figure 4 is an enlarged sectional view taken substantially along section line 4—4 of Figure 1;

Figure 5 is a sectional view taken substantially along section line 5—5 of Figure 4;

Figure 6 is an enlarged sectional view taken substantially along section line 6—6 of Figure 1;

Figure 7 is a perspective view of the removable portion of the trailer hitch showing one position in which the trailer ball may be attached thereto; and Figure 8 is a perspective view similar to Figure 7 showing an alternative position for attachment of the trailer ball.

Figure 1:
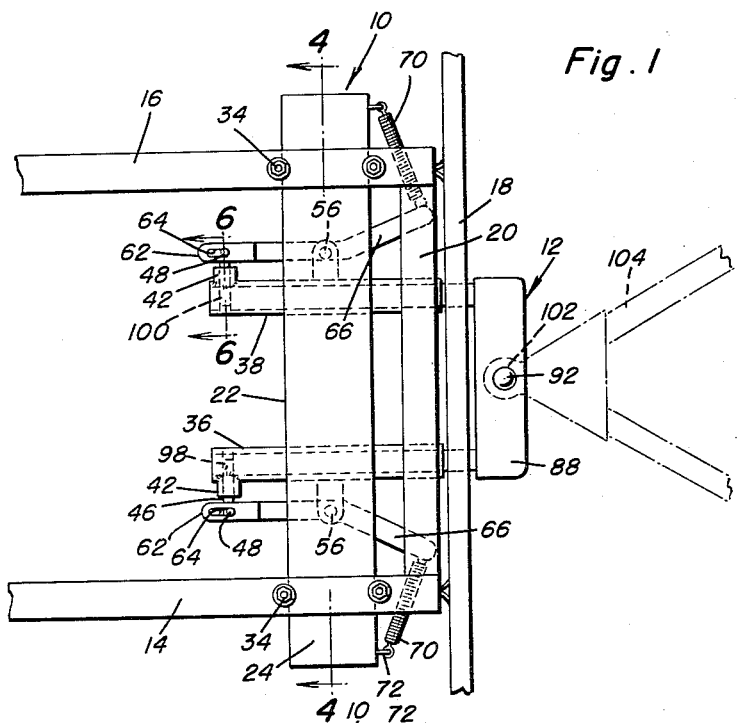
Figure 1 is a top plan view of the trailer hitch in an assembled position, with portions of the towing vehicle frame and bumper broken away and the tongue of the trailer shown in phantom lines.
Figure 2:
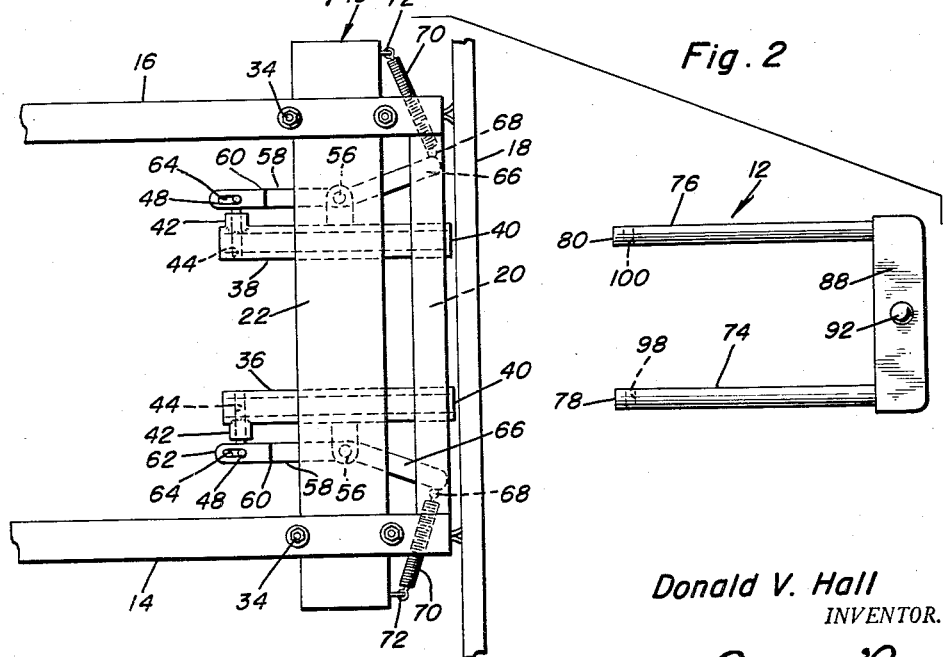
Figure 2 is a top plan view showing the removable portion of the trailer hitch removed from the portion which is attached to the vehicle and with portions of the towing vehicle frame and bumper broken away.

Referring now to the drawings in detail it will be noted that the trailer hitch consists of a stationary member, which is referred to in general by the reference numeral 10 and a removable member, which is referred to in general by the reference numeral 12. The stationary member 10 is attached to a towing vehicle having a left side rail 14, a right side rail 16, and a rear bumper 18, which is attached to the frame rails 14 and 16. The frame rails 14 and 16 are connected by a rear cross member 20. The stationary member 10 consists of a frame bar 22 which extends transversely of the towing vehicle and is actually in the form of a channel iron having an upper horizontal web 24 with depending flanges 26 and 28. The flanges 26 and 28 are provided adjacent the outer ends thereof with a plurality of semi-circular notches 30. The notches 30 are selectively engageable by the bight portion of J-bolts 32, the shank of which extend upward through the frame rails 14 and 16 and terminate above the rails. The J-bolts are maintained in position and tightened by means of nut 34. In this manner the frame 22 is anchored to the frame rails 14 and 16. It will be noted that a plurality of notches 30 are provided in order that the hitch may be adapted to fit various widths of vehicle frames.

There is mounted below the frame bar 22 a pair of tubular socket members 36 and 38. The socket members 36 and 38 are parallel to the longitudinal center line of the towing vehicle and are equidistant therefrom. Inasmuch as the socket members 36 and 38 are identical in configuration, one of these members will be described and like numerals used on both.

The socket members are elongated and extend equidistant to the front and rear of the frame bar 22. They terminate in a rear face 40, which is within the protected area of the rear bumper 18. At the forward end of the socket member there is provided, as is best seen in Figure 6, an outwardly extending boss 42 having an aperture 44 centrally disposed therein. The aperture 44 extends through the boss 42 and through the wall of the socket member. The aperture 44 extends diametrically thereacross and receives therein a lock pin 46. The lock pin 46 is freely slidable in the aperture 44 and has adjacent the outer end thereof an upstanding operating arm 48. Suitably attached to the socket member, at the approximate center thereof there is provided a pair of bifurcated ears 50 and 52 which receive therebetween a lock pin operating lever 54. The operating lever 54 is pivotally retained between the ears 50 and 52 by means of a pivot pin 56. The lever 54 extends forward and parallel to the socket member in a leg 58 which is offset upward as at 60, the purpose of which will be described hereinafter. The leg 58 terminates in an arcuate end 62. The leg 58, in alignment with the arm 48, is provided with an elongated slot 64 which engages and retains therein the arm 48. The lever 54 is angulated outward toward the rear and is provided with an operating handle 66. The outer end of the handle 66 is provided with an eye 68 which is engaged by a spring 70, which in turn is anchored to an eye 72, which is anchored adjacent to the outer extremity of the frame.

The removable member 12 consists of a pair of elongated cylindrical members 74 and 76. The cylindrical members are of such a size as to be slidable in the sockets of the socket members 36 and 38. The members 74 and 76 terminate at the inner end thereof in inner faces 78 and 80 respectively and at the outer end in faces 82 and 84. At the outer ends of the members 74 and 76 there is also provided a cross bar which is referred to in general by the reference numeral 86 and has an upper surface 88 and a lower surface 90. It should be understood that the cross bar 86 is solidly welded to the outer circumference of the cylindrical members in order to maintain the members in spaced parallel relation. Centrally disposed on the cross bar 86 there is provided a trailer ball 92 having a shank 94 which is threaded and receives thereon a keeper nut 96. Adjacent the inner ends 78 and 80 there are provided apertures 98 and 100 respectively. The apertures 98 and 100 are horizontally disposed in the members 74 and 76. When the members 74 and 76 are inserted into the socket members 36 and 38, the apertures are in alignment with the apertures 44 and are engageable by the pins 46.

As will be noted in Figure 1 the ball 92 is engageable by a socket 102 which is mounted on a tongue 104 of the trailer.

In operation, assuming that the immovable portion 10 has been mounted on a towing vehicle, the cylindrical members 74 and 76 are inserted in their respective sockets, the operating handles 66 pressed inward, thereby retracting the lock pins 46 and allowing the apertures 98 and 100 to become aligned with the apertures 44. The operating handles 66 are then released, whereupon the springs 70 will retract the operating handles thus causing the lock pins 46 to engage the apertures 98 and 100 and retain the movable portion in the sockets. It should be noted that the movable portion 12 may be inserted with the cross bar 86 above or below the cylindrical members thus selectively raising or lowering the cross bar 86. Of course, it should be understood that it is necessary to change the trailer ball to the position desired when inserting the movable portion in either position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A trailer hitch comprising a bar, means for attaching the bar transversely to and beneath the side rails of a towing vehicle, a pair of spaced tubular socket members carried by said bar beneath the same, a pair of elongated cylindrical members removably telescoped into said tubular members and replaceable therein, a cross bar attached to the outer ends of said cylindrical members, said cross bar maintaining said cylindrical members in parallel spaced relation and forming therewith a member invertible when said cylindrical members are removed and replaced in said socket members, a trailer ball removably carried by said cross bar and replaceable on top of said cross bar when said member is inverted, lock means associated with the inner ends of said socket members whereby said cylindrical members may be removably locked into said socket members, said lock means comprising a first pair of apertures in said socket members, a second pair of apertures in said cylindrical members, and lock pins slidable in said apertures whereby said second pair of apertures may be aligned with said first pair of apertures and said lock pins inserted therein, control means associated with said lock pins for remotely removing and inserting said lock pins in said apertures, said control means including a pair of operating levers pivotally attached intermediate their ends to their respective socket members and having outer ends inclining outwardly away from the socket members, the inner ends of said levers slidably and pivotally attached to said lock pins, whereby the outer ends of said levers may be actuated to engage or disengage said lock pins in said second pair of apertures, a pair of springs attached to the outer ends of said levers and to the ends of said bar and normally maintaining said lock pins in engagement in said apertures, said cross bar attached to the circumferential surfaces of said cylindrical members whereby said cross bar may be selectively placed above or below the longitudinal center lines of said cylindrical members by inverting said member and the trailer ball raised or lowered when removed and replaced on top of said cross bar.

References Cited in the file of this patent

UNITED STATES PATENTS

| 1,488,950 | Uecker | Mar. 20, 1923 |
| 2,615,292 | Winchell | Oct. 28, 1952 |
| 2,671,674 | Derskin | Mar. 9, 1954 |
| 2,747,829 | Jones | May 29, 1956 |

FOREIGN PATENTS

| 602,486 | Great Britain | May 27, 1948 |